United States Patent [19]

Fengels

[11] 4,118,840
[45] Oct. 10, 1978

[54] FASTENING HOOK

[75] Inventor: Gerd Fengels, Hagen, Germany

[73] Assignee: Brüggemann & Brand KG, Wetter, Ruhr, Germany

[21] Appl. No.: 782,775

[22] Filed: Mar. 30, 1977

[30] Foreign Application Priority Data

Apr. 7, 1976 [DE] Fed. Rep. of Germany ....... 2614961

[51] Int. Cl.² ............................................. A44B 13/02
[52] U.S. Cl. .................................. 24/239; 24/232 R; 24/234
[58] Field of Search ................. 24/232, 233, 234, 238, 24/239, 241 P, 241 PS

[56] References Cited

U.S. PATENT DOCUMENTS

| 28,669 | 6/1860 | Henshaw | 24/239 |
| 453,877 | 6/1891 | BonFoey | 24/239 |
| 582,220 | 5/1897 | McClory | 24/239 |
| 1,005,370 | 10/1911 | Turney | 24/238 |
| 3,317,972 | 5/1967 | Harley | 24/239 |
| 3,367,001 | 2/1968 | Raschke | 24/241 P |

Primary Examiner—Kenneth J. Dorner

[57] ABSTRACT

A fastening hook comprises a loop connected by means of a shank to a hook portion which defines a gap. The gap may be closed by a closure member mounted pivotally and slideably at the upper end of the hook portion. The free end of the closure is open and fits over the hook tip. The closure member is biased into engagement with the hook tip by a spring. Thus to open the gap the closure member is slid linearly out of engagement with the hook tip and then pivoted outwardly.

10 Claims, 5 Drawing Figures

FASTENING HOOK

This invention, relates to fastening hooks, particularly for high loads, of the type comprising a loop at the upper end joined by means of a shank to a hook portion which defines a gap between the upper end of the hook portion and the hook tip, which gap may be closed by means of a closure member pivotally mounted on the upper end of the hook portion, in which the free end of the closure member is adapted to engage the hook tip when in the closed position.

Fastening hooks of the aforementioned type can be used, amongst other things, for securing and transporting external loads by helicopter. The loop of the fastening hook serves to receive a heavy duty carrying strap, and a connecting piece firmly connected to the load is hung in the hook portion.

In a known type of fastening hook, after hanging the connecting piece on the hook portion a closure member pivotally mounted on a projection at the upper end of the hook portion is biased by spring pressure into a closed position in which the free end of the closure member abuts the hook tip. The gap is opened by pivoting the closure member inwardly against the force of the spring so that the connecting piece may be removed from the hook portion through the open gap.

It is the object of the present invention to construct the closure member and to mount it on the hook portion so that an unintentional opening of the hook gap is prevented.

This object is achieved in accordance with the present invention by mounting the closure member pivotally and slideably on the upper end of the hook portion its end being adapted to move linearly into the closed position in which it cooperates with the hook tip.

It is a further object of the invention to avoid the dangerous effects of a lateral force acting on the closure member by mounting one end of the closure member on the hook portion as before and securing the other end, i.e. the free end, of the closure member directly to the hook tip when in the closed position. To open the gap in the hook, two different movements must be executed one after the other, in order to ensure the necessary degree of safety. Thus to open the gap, the closure member is slid linearly away from the hook tip and then pivoted into the open position in which the connecting piece may be removed from the hook. The closure member is returned to the closed position by carrying out the movements in reverse order.

It is possible to insert the closure member in a slotted or similarly constructed hook tip. However, in a preferred embodiment of the invention in which the free end of the closure member at least partially embraces or surrounds the hook tip when in the closed position the free end of the closure member can be simply and releasably secured to the hook tip when in the closed position and the cross section of the hook tip is not weakened. The greatest possible degree of safety is achieved when the free end of the closure member is a continuous surface, e.g. of circular form.

Mere linear movement of the closure member into engagement with the hook tip may be perfectly satisfactory, particularly when the closure member may be locked in the closed position engaging the hook tip. Preferably, however, the closure member is located in the closed position against undesired movement. Such location is preferably effected by the force of a compression spring which urges the closure member into the closed position cooperating with the hook tip. Thus an unintentional movement of the closure member into the open position is prevented, whilst the force of a hand or finger is sufficient to move the closure member against the force of the spring away from the hook tip so as to open the hook.

In a particularly advantageous construction in which the combined angular and linear movement of the closure member on the fastening hook is achieved, a pin is rotatably mounted on a projection on the hook portion and secured against axial movement, the two ends of the pin extending beyond the projection and being of rectangular cross section and extending into longitudinal slots formed in side portions of the closure member thus forming a linear guide for the closure member. The side portions of the closure member therefore abut the projection, and the pivot pin rotatably mounted on the projection in conjunction with the longitudinal slots constitute the angular and linear guide for the closure member.

In a simple structural embodiment of a fastening hook the closure member, which comprises two side portions extending one either side of the projection and a free end which is adapted to receive the hook tip, is constructed of steel plate of substantially U section. Thus the side portions of the steel plate are bent away from the middle portion so as to be spaced apart and substantially parallel, whilst the wall at the free end whose shape corresponds to that of the hook tip is largely or wholly continuous.

A protective arrangement for the spring which serves to locate the closure member in the closed position is achieved in a preferred embodiment of the invention in which the projection comprises two limbs in spaced relationship through which the pivot pin extends and in which a compression spring is provided within the closure member, one end of which spring acts on the exposed central portion of the pivot pin and the other end of which acts on a shoulder arranged on the inner side of the closure member and spaced from its free end. When the closure member is manufactured from steel plate the shoulder may be stamped out as a flap and bent inwardly. The spring which acts on the central portion of the pivot pin also acts against the shoulder and thus urges the closure member into the closed position. When the closure member is rotated the spring is carried with it in a preferred embodiment in which the compression spring comprises a helical spring through which a carrier rod passes, which rod extends transverse to and is secured to the central portion of the pivot pin and is slideably guided in an opening in the shoulder. The carrier rod slides in the opening in the shoulder when the closure member is moved in its longitudinal direction, and carries the spring with it when the closure member is pivoted from an open position to an intermediate position or vice versa.

In order that the closure member may be easily pulled back against the forces of the spring the hook is provided, in accordance with a further preferred feature of the invention, with grip pieces bent outwardly from the side portions of the closure member at the end at which it is mounted.

A specific embodiment of the invention will now be described in more detail by way of example with reference to the accompanying drawings in which.

Figure 1:
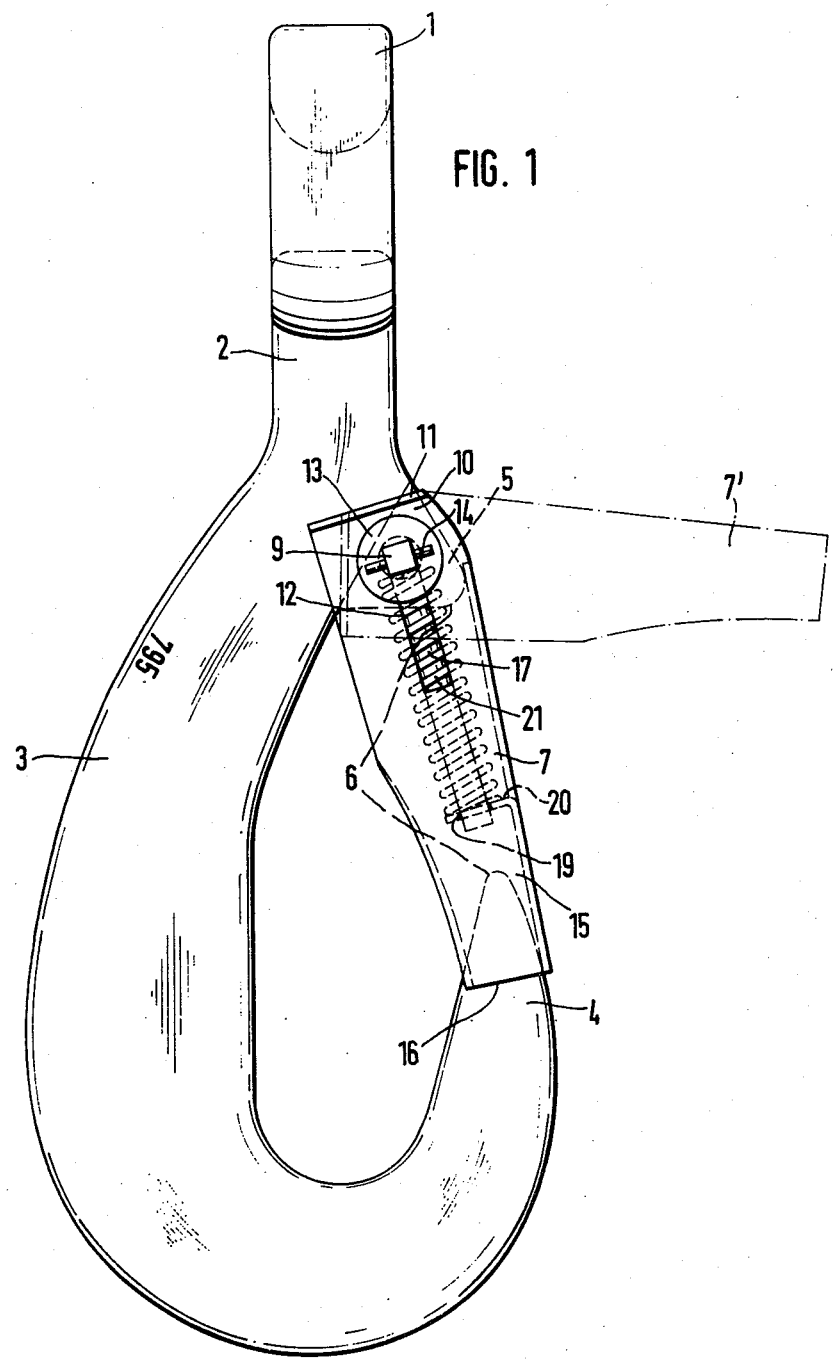
FIG. 1 is a side elevation of a fastening hook having a closure member which is shown in the closed position.
Figure 2:
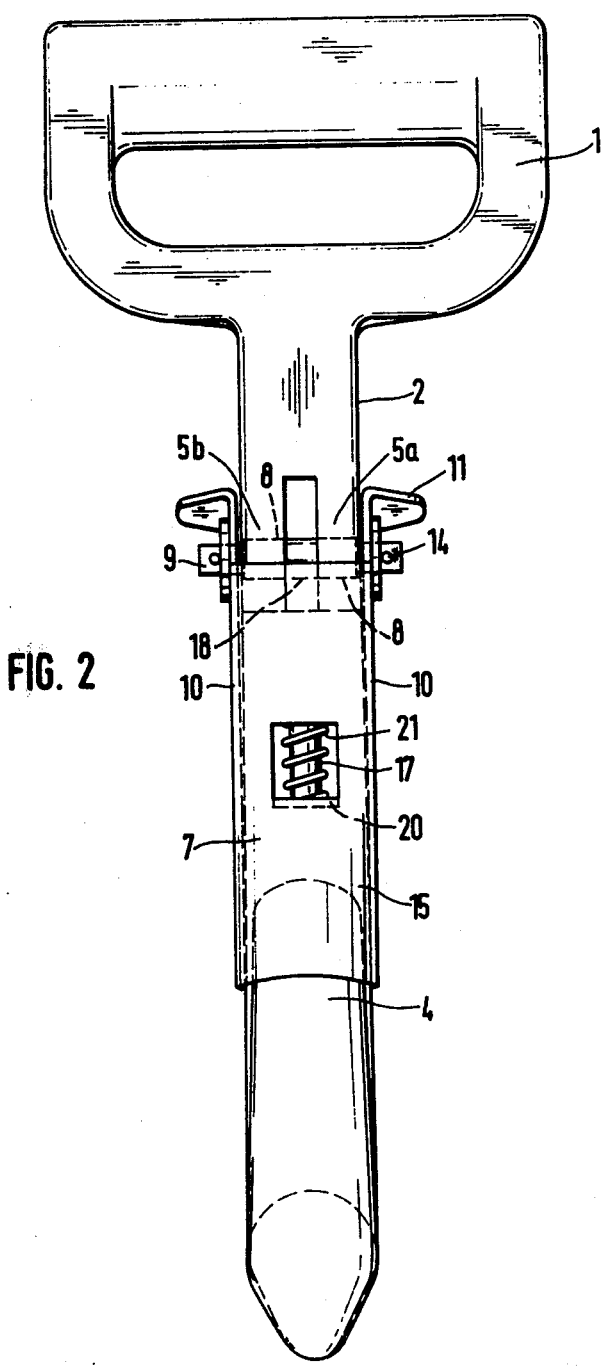
FIG. 2 is a front view of the hook of FIG. 1.

The illustrated fastening hook has a loop 1 at its upper end connected to a short shank 2 which is in turn connected to a hook portion 3 lying in a plane at right angles to that of the upper loop. A gap 6 extends between a hook tip 4 and a projection 5 situated at the upper end of the hook portion 3. This gap may be closed by a closure member 7 when the latter is in the closed position as shown in FIG. 1.

A pivot pin 9 which serves as a combined pivotal and sliding mount for the closure member 7 is rotatably mounted in holes 8 formed in a projection 5 which is divided into two limbs 5a and 5b spaced apart from one another.

The closure member 7 which is stamped out from a steel sheet has side portions 10 which are bent away and spaced apart so that its upper section is of substantially U form. Each of the side portions has a grip piece 11 bent outwardly at its upper end. A pivot pin 9 passes through longitudinal slots 12 formed in the upper section of the side portions and is secured in position by means of a shim 13 and peg 14 at each end as may be seen in the drawings.

Towards its free end the cross section of the closure member becomes increasingly closed and at its free end 15 defines an opening 16 which has a continuous wall, so that the free end 15 of the closure member is moveable linearly on to the hook tip.

A rod 17 is secured to the underside of the exposed central portion 18 of the pivot pin 9 and extends therefrom in the longitudinal direction of the closure member. The free end of the rod 17 is slideably guided in an opening 19 in a shoulder 20 comprising a bent over flap. A helical spring 21 is retained in position by the rod 17 compressed between the shoulder 20 and the central portion 18 of the underside of the pin 9, and thus urges the closure member 7 away from the pin 9 into engagement with the hook tip 4.

The closure member 7 is movable from the closed position shown in FIG. 1 in solid lines in which it is slid onto the hook tip 4 and in which it is located by the helical spring, into the open position in which it is shown in chain dotted lines. In this open position connecting elements such as supporting ropes, load rings or the like may be hung in the fastening hook or removed from it.

Figure 3:
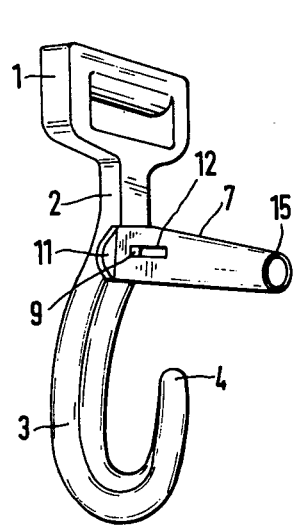
FIGS. 3 to 5 are three perspective views of a fastening hook with the closure member in the open, intermediate and closed position respectively.
Figure 4:
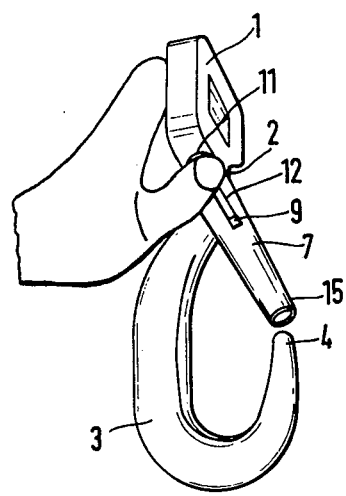
Figure 5:
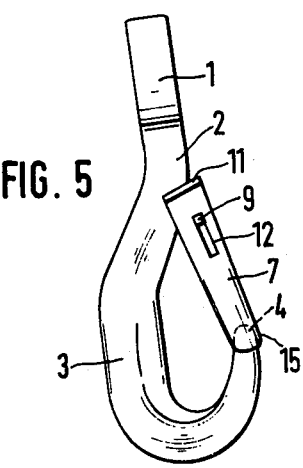

FIGS. 3 to 5 illustrate the three most important stages when closing the fastening hook. The closure member 7 is pivoted from the open position shown in FIG. 3 until its free end 15 is in the region of the hook tip 4. The closure member 7 is now pulled upwardly manually against the force of the spring 21 by applying pressure to the grip pieces 11, thus causing linear movement of the longitudinal slots 12 relative to the pivot pin 9, until the opening 16 is directly above the hook tip 4. If the manual force is now released the free end 15 of the closure member 7 slides down over the hook tip 4 until it reaches the closed position shown in FIG. 5.

Regardless of the side from which forces act on the closure member 7 it will remain in its closed position so that a supporting rope or the like can not slip out of the hook unintentionally. The hook opening 6 can only be opened when the closure member 7 is pulled upwardly by the grip pieces 11 against the force of the spring 21.

What I claim as my invention and desire to secure by Letters Patent is:

1. A fastening hook, particularly for high loads, said hook having an upper end comprising a loop, a hook portion, and a shank connecting said loop and said hook portion, said hook portion comprising a projection at its upper end having two limbs in spaced relationship, and a hook tip, and defining a gap between said projection and said hook tip, a closure member having an upper end and a free end adapted to engage said hook tip, and means on said projection for mounting said closure member at its upper end for angular and translational movement from an open position to a closed position in which said closure member closes said gap, said mounting means comprising a pivot pin rotatably mounted on said projection and located against axial movement, said pin extending through said two limbs and having an exposed central portion, and wherein a spring having two ends is provided within said closure member to bias said closure member into the closed position in engagement with said hook tip, one of said ends of said spring acting on said central portion of said pivot pin and the other of said ends acting on a shoulder fixed in the interior of said closure member and spaced from said free end, whereby said free end of said closure member can be moved linearly into said closed position in which it engages said hook tip, and can be moved linearly out of engagement with said hook tip and then rotated about said pivot pin to an open position.

2. A hook as claimed in claim 1 wherein said pivot pin has two ends projecting beyond said projection, each of said ends having a rectangular cross section, and in which said closure member is formed with two longitudinal slots, each of said slots accommodating one of said rectangular ends of said pin forming a linear guide for said closure member.

3. A hook as claimed in claim 2 wherein said free end of said closure member at least partially surrounds said hook tip when in the closed position.

4. A hook as claimed in claim 2 wherein said closure member is constructed of steel plate and has a substantially U-shaped cross section at and near its upper end and a substantially circular cross section at and near its free end, the legs of said U-shaped cross section forming two side portions which extend on either side of said projection and each having one of said longitudinal slots formed therein.

5. A hook as claimed in claim 4 wherein said side portions of said closure member adjacent its upper end are provided with outwardly bent grip pieces for manually engaging and moving said closure member.

6. A hook as claimed in claim 1 wherein said spring comprises a helical spring through which a carrier rod passes, said rod extending transverse to and secured to said central portion of said pivot pin and slideably guided in an opening in said shoulder.

7. A hook as claimed in claim 6 wherein said pivot pin has two ends projecting beyond said projection, each of said ends having a rectangular cross section, and in which said closure member is formed with two longitudinal slots, each of said slots accommodating one of said rectangular ends of said pin forming a linear guide for said closure member.

8. A hook as claimed in claim 7 wherein said free end of said closure member at least partially surrounds said hook tip when in the closed position.

9. A hook as claimed in claim 7 wherein said closure member is constructed of steel plate and has a substantially U-shaped cross section at and near its upper end and a substantially circular cross section at and near its free end, the legs of said U-shaped cross section forming two side portions which extend on either side of said projection and each having one of said longitudinal slots formed therein.

10. A hook as claimed in claim 9 wherein said side portions of said closure member adjacent its upper end are provided with outwardly bent grip pieces for manually engaging and moving said closure member.

* * * * *